(12) United States Patent
Miyanaga (10) Patent No.: US 7,446,233 B1
(45) Date of Patent: Nov. 4, 2008

(54) SURFACE MODIFIER

(75) Inventor: Seiichi Miyanaga, Wakayama (JP)

(73) Assignee: KAO Corporation, Tokyo (JP)

( * ) Notice: Subject to any disclaimer, the term of this patent is extended or adjusted under 35 U.S.C. 154(b) by 1889 days.

(21) Appl. No.: 09/763,156

(22) PCT Filed: Jun. 5, 2000

(86) PCT No.: PCT/JP00/03643

§ 371 (c)(1),
(2), (4) Date: Mar. 21, 2001

(87) PCT Pub. No.: WO00/77087

PCT Pub. Date: Dec. 21, 2000

(30) Foreign Application Priority Data

Jun. 16, 1999 (JP) .................................. 11-169297

(51) Int. Cl.
*C08L 101/00* (2006.01)
*C08G 65/04* (2006.01)
*C08G 65/329* (2006.01)

(52) U.S. Cl. ................... 568/622; 568/625; 568/672; 568/678; 568/679; 523/212; 524/858

(58) Field of Classification Search .................. None
See application file for complete search history.

(56) References Cited

U.S. PATENT DOCUMENTS

| | | | |
|---|---|---|---|
| 3,399,149 A | | 8/1968 | Garty et al. |
| 3,578,719 A | * | 5/1971 | Kalopissis et al. ........... 568/608 |
| 3,832,301 A | | 8/1974 | Lazare et al. |
| 4,049,861 A | | 9/1977 | Nozari |
| 4,360,645 A | | 11/1982 | Krespan et al. |
| 4,384,128 A | | 5/1983 | Krespan et al. |
| 4,465,799 A | | 8/1984 | Platkiewicz et al. |
| 4,722,816 A | | 2/1988 | Ueno et al. |
| 5,180,856 A | | 1/1993 | Stehr et al. |

FOREIGN PATENT DOCUMENTS

| | | |
|---|---|---|
| EP | A2382931 | 8/1990 |
| EP | 0407857 A2 | 1/1991 |
| EP | 0779337 A1 | 8/1997 |
| JP | A2196825 | 8/1990 |
| JP | A2235926 | 9/1990 |
| JP | A925440 | 1/1997 |
| JP | A952978 | 2/1997 |
| WO | WO99/42513 A1 | 8/1999 |

OTHER PUBLICATIONS

Vysotskaya et al.; Effect of Surfactants on the crack resistance of epoxy-rubber materials, Jul. 1988, Mechanics of Composite Materials, vol. 23, No. 4, pp. 513-518.*
Amanokura et al., Effect of Surfactant on Alkali Development of Photosensitive Resist Material Based on a Flame-Retardant Amide-Type Resin, 1999, Science and Industry, vol. 73, No. 3, pp. 114-119, abstract only.*
Takeaki et al., published Jan. 1996, machine translation and abstract of JP 08-012619).*
Kenji et al., published Mar. 1999, machine translation and abstract of JP 11-080783.*
Kimiyoshi et al., published May 1996, machine translation and abstract of JP 09-316144.*
Renouf et al., Chemistry and Physics of Lipids, 99, 1999, pp. 21-32.*
Dworak et al., Macromol. Chem. Phys. vol. 196, pp. 1963-1970, (1995).
English language abstract of JP 60 130644 A (Jul. 12, 1985).

* cited by examiner

*Primary Examiner*—Rosalynd Keys
(74) *Attorney, Agent, or Firm*—Birch, Stewart, Kolasch & Birch, LLP (57) ABSTRACT

The present invention provides a surface modifier for an inorganic solid, of which a small amount improves efficiently and significantly the affinity of the inorganic solid with a medium, thus obtaining a composition having no bad effects even if the inorganic solid is blended in a large amount. That is, the present invention provides a surface modifier for an inorganic solid, which comprises a polyether having a monomeric unit represented by the formula (I); a inorganic solid having at least a part of its surface coated with the surface modifier; and a composition comprising the surface modifier and a inorganic solid:

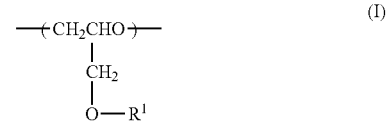

wherein $R^1$ represents a hydrogen atom, a $C_{1-50}$ hydrocarbon or fluoroalkyl group, a $C_{6-50}$ fluoroaryl group, a $Si_{1-50}$ siloxysilylpropyl group, etc.

13 Claims, 4 Drawing Sheets

SURFACE MODIFIER

This application is the national phase under 35 U.S.C. § 371 of PCT International Application No. PCT/JP00/03643 which has an International filing date of Jun. 5, 2000, which designated the United States of America.

TECHNICAL FIELD

The present invention relates to a surface modifier being useful for dispersing an inorganic solid in various media, an inorganic solid having (or with) its modified surface, a composition containing the same and being useful in a field of a synthetic resin, etc.

BACKGROUND ART

The inorganic solid such as silica, titanium oxide, alumina, calcium carbonate, aluminum hydroxide, carbon black, a conductive metal powder, a glass fiber, a carbon fiber, a clay mineral, a pigment (e.g. a metal oxide or a lake) is used for various purposes as a material to be blended in a synthetic resin composition, a wax composition or a liquid composition or as a functional powder (e.g. a cosmetic powder) by itself. In this case, the surface characteristics of the inorganic solid greatly affect the physical properties of various compositions or functional powders, thus often significantly suppressing the realization of desired functions.

For example, in the synthetic resin composition or the liquid composition, a surface of the inorganic solid lacks an organic affinity, thereby stripping (or removing) an interface from the medium (referring to as a matter forming a continuous phase in the composition hereinafter) or aggregating the inorganic solid, thus not only significantly deteriorating workability but also causing a fatal problem such as a significant reduction or brittleness in material strength, a deterioration in color (or hue), a conversion into a nonconductor and a separation of pigments by sedimentation. In the functional powder, there are arisen a formation of a coagulum (or aggregate), a reduction in a charging characteristic or fluidity, an exhibition of an unpleasant feeling such as a creaky feeling or the like. Because this problem becomes remarkable in particular when a total area of the interface between the medium and the inorganic solid is increased, for example when a large amount of the inorganic solid is used or when fine inorganic solids are used, a more effective utilization of the inorganic solid is limited significantly.

To lessen such the problem, various surface modifiers have been used. For example, a silane coupling agent is very expensive besides there is not satisfactory the organic affinity of the treated surface of the inorganic solid therewith. Further, the silane coupling agent works effectively due to a characteristic of the functional group thereof, when the inorganic solid is limited as silica, glass fibers, alumina or the like. While, the silane coupling agent has a serious problem that the agent does not function at all to a material lacking a reactivity, such as titanium oxide, calcium carbonate, carbon black and graphite.

An anionic, cationic or nonionic low-molecular surfactant or an aliphatic acid may be used as the other surface modifier being inexpensive for the inorganic solid in some cases but a covering (or coating) power to the surface of this inorganic solid is very weak. Thus, they have been used as the surface modifier in a significantly limited field.

DISCLOSURE OF INVENTION

An object of the present invention is to provide a surface modifier for a inorganic solid, of which a small amount improves efficiently an affinity of at least one of various inorganic solids in a wide fields with a medium, and as the result, by which is obtained a composition having no bad effects even if the inorganic solid is blended in a large amount. Another object of the present invention is also to provide an inorganic solid having a surface treated with the surface modifier as well as a composition containing the same.

The present invention provides the surface modifier for an inorganic solid (referred to as the surface modifier of the present invention hereinafter) which comprises a polyether having a monomeric unit represented by the formula (I) (referred to as monomeric unit (I) hereinafter); an inorganic solid having at least a part of its surface coated (or covered) with the surface modifier of the present invention; and a composition of a synthetic resin, a rubber, a wax, a liquid, a flame-retardant resin or the like, which comprises the surface modifier of the present invention and an inorganic solid:

wherein $R^1$ represents a hydrogen atom; an optionally substituted $C_{1-50}$ hydrocarbon, $C_{1-50}$ fluoroalkyl, $C_{6-50}$ fluoroaryl or $Si_{1-50}$ siloxysilylpropyl group; or a group represented by $-(AO)_m-R^2$:

in which $R^2$ represents an optionally substituted $C_{1-42}$ hydrocarbon, $C_{1-42}$ fluoroalkyl, $C_{6-42}$ fluoroaryl or $Si_{1-40}$ siloxysilylpropyl group; A represents a $C_{2-3}$ alkylene group; m is a number selected from 1 to 100; and m×A's may be the same or different.

The surface modifier of the present invention is adsorbed onto a surface of an inorganic solid, thereby improving the organic affinity of the surface.

Further, the present invention provides a method which comprises treating an inorganic solid with the polyether defined above and dispersing it in a medium; and a method which comprises treating a surface of an inorganic acid with the said polyether to modify the surface.

Further, the present invention provides use of the polyether defined above with an inorganic solid for dispersing in a medium and use of the said polyether for modifying a surface of an inorganic solid.

The medium described above is preferably a synthetic resin, a rubber, a wax, a flame-retardant resin composition or a liquid.

MODES FOR CARRYING OUT THE INVENTION

[1] Inorganic Solid

The kind and form of an inorganic solid in the present invention are not limited. For example, it is possible to use (a) a metal oxide such as silica, titanium oxide, alumina, zirconium oxide, zinc oxide, ferrite oxide, Co-ferrite, magnetite, $\alpha$-$Fe_2O_3$, $\gamma$-$Fe_2O_3$, indium oxide-tin oxide (ITO), magnesium oxide and calcium oxide, (b) a metal hydroxide such as sodium hydroxide, magnesium hydroxide and aluminum hydroxide, (c) the other metal salt such as sodium carbonate, sodium hydrogencarbonate, calcium carbonate, sodium sulfate, barium sulfate, sodium chloride, potassium titanate and talc, (d) a non-oxide-based ceramic such as boron nitride, aluminum nitride, titanium nitride and silicon carbide, (e) a metal powder such as α-Fe powder, silver powder, copper powder and silicon powder, (f) a carbon material such as carbon black, graphite and carbon whisker, (g) a clay mineral such as mica, smectite (montmorillonite etc.) and sericite, (h) an inorganic fibrous material such as glass fiber and carbon fiber, (i) an inorganic pigment such as red iron oxide, white lead, chrome yellow, iron blue and titanium white, (j) a metal ion-containing organic pigment such as phthalocyanine blue and a dyeing lake (insofar as a metal ion is contained, an organic pigment is also the inorganic solid in the present invention) or the like. A mixture of two or more of these inorganic solids may also be used.

The form thereof may be particulate (or granular) or fibrous. In the case of the particulate form, the average particle diameter thereof is preferably 0.8 nm to 1 mm, more preferably 3 nm to 300 μm, most preferably 5 nm to 10 μm. In the case of the fibrous form, the average diameter of a section thereof is preferably 0.8 nm to 1 mm, more preferably 3 nm to 300 μm, most preferably 5 nm to 10 μm.

[2] Surface Modifier

When $R^1$ in the monomeric unit (I) is a hydrocarbon group, preferable examples thereof include a $C_{1-42}$ alkyl or alkenyl group, a $C_{6-42}$ aryl group and a $C_{7-43}$ arylalkyl or alkylaryl group. More preferable examples include methyl group, ethyl group, n-propyl group, isopropyl group, n-butyl group, t-butyl group, octyl group, decyl group, dodecyl group, cetyl group, stearyl group, phenyl group, nonylphenyl group and the like.

When $R^1$ is a fluoroalkyl group, preferable examples thereof include a $C_{1-22}$ perfluoroalkyl group, an ωH-perfluoroalkyl group and a fluoroalkyl group represented by the following formula (II):

—E—$R^f$    (II)

wherein E represents a $C_{1-3}$ alkylene group and $R^f$ represents a $C_{1-22}$ perfluoroalkyl group or ωH-perfluoroalkyl group.

Among these groups, more preferable examples include perfluorobutyl group, perfluorohexyl group, perfluorooctyl group, perfluorododecyl group, perfluoro-3-methylbutyl group, 4H-octafluorobutyl group, 6H-dodecafluorohexyl group, 8H-hexadecafluorooctyl group, 1H,1H,2H,2H-nonafluorohexyl group, 1H,1H,2H,2H-tridecafluorooctyl group, 1H,1H,2H,2H-heptadecafluorodecyl group, 1H,1H,5H-octafluoropentyl group, 1H,1H,7H-dodecafluoroheptyl group, 1H,1H,9H-hexadecafluorononyl group and the like.

When $R^1$ is a fluoroaryl group, preferable examples thereof include perfluorophenyl group.

When $R^1$ is a siloxylsilyl propyl group, preferable examples thereof include a linear or branched siloxylsilyl propyl group having 1 to 30 silicon atoms, particularly 1 to 20 silicon atoms. Alkyl substituent groups bounded to silicon atoms in these siloxysilyl propyl groups may be the same or different. The alkyl substituent group includes methyl group, butyl group, vinyl group, phenyl group and the like.

In the monomeric unit (I), $R^1$ may have a substituent group. Then, the substituent group may be hydroxyl group, an alkoxy group (having 1 to 30 carbon atoms), amino group, dimethylamino group, diethylamino group, an amide group (having 1 to 18 carbon atoms), a trialkylammonium group (wherein the alkyl group has 1 to 30 carbon atoms), a dialkylammonium group (wherein the alkyl has 1 to 30 carbon atoms), an alkylammonium group (wherein the alkyl group has 1 to 30 carbon atoms), ammonium group, a methyl ester group, an ethyl ester group, carboxyl group, an acyl group (having 1 to 18 carbon atoms), silyl group, siloxy group (hereinafter referred to as "the substituent group of the present invention") and the like.

In the case where $R^1$ is a group represented by —(AO)$_m$—$R^2$, when $R^2$ is a hydrocarbon group, as a preferable example thereof can be instanced methyl group, ethyl group, n-butyl group, t-butyl group, octyl group, dodecyl group, cetyl group, stearyl group, phenyl group, nonylphenyl group or the like.

When $R^2$ is a fluoroalkyl group, a preferable example thereof includes a fluoroalkyl group represented by the formula (II) mentioned above. Among these groups, a more preferable example includes 1H,1H,2H,2H-nonafluorohexyl group, 1H,1H,2H,2H-tridecafluorooctyl group, 1H,1H,2H,2H-heptadecafluorodecyl group, 1H,1H,5H-octafluoropentyl group, 1H,1H,7H-dodecafluoroheptyl group, 1H,1H,9H-hexadecafluorononyl group and the like.

When $R^2$ is a fluoroaryl group, a preferable example thereof includes perfluorophenyl group.

When $R^2$ is a siloxylsilyl propyl group, a preferable example thereof includes a $Si_{1-20}$ siloxylsilyl propyl group. Alkyl substituent groups bounded to silicon atoms in these siloxysilyl propyl groups may be the same or different. The alkyl substituent group includes methyl group, butyl group, vinyl group, phenyl group and the like.

$R^2$ may have a substituent group. The substituent group includes "the substituent group of the present invention".

A may be ethylene group or propylene group. m is preferably 1 to 50 and more preferably 5 to 10.

The surface modifier of the present invention is obtained by polymerizing epoxy compounds of the formula (III) or by polymerizing another monomer(s) therewith. That is, the surface modifier represented by formula (IV) is obtained in the following manner:

wherein $R^1$ has the same meanings as defined above;

X represents another monomer being copolymerizable with the substituted epoxide (III);

Y represents a monomeric unit derived from the monomer X;

a is zero or 1;

each of p and q represents a number for polymerizing (or repeating) monomeric units provided that when a is zero, q is equal to zero and when a is not equal to zero, q is not equal to zero, whereupon p is preferably 5 to 2,000,000, more preferably 5 to 1,000,000 and most preferably 10 to 100,000, and q is preferably 1 to 100,000.

In the surface modifier (IV) of the present invention, $R^1$'s may comprise plural kinds. In this case, the arrangement of monomeric units in the main chain containing polyether may be any one selected from block, alternate and random. When the surface modifier (IV) has the monomeric unit Y, the mode of arrangement thereof may be any one selected from block, alternative and random.

The monomer X may be ethylene oxide, a substituted epoxide other than the substituted epoxide (III) or an anionic polymerizable monomer other than epoxides. A preferable example thereof may be ethylene oxide, propylene oxide, a $C_{4-22}$ alkylene oxide, 3-perfluoroalkyl-1,2-epoxy propane, a 4-, 6- or 7-membered lactone, a 5- or 6-membered carbonate, a lactam, hexamethyl cyclotrisiloxane, octamethyl cyclotetrasiloxane, a (meth)acrylate such as a methyl(meth)acrylate, styrene, butadiene, isoprene, a $C_{5-22}$ terminal olefin or the like.

[3] Inorganic Solid Having its Surface Coated with the Surface Modifier

An inorganic solid having an improvement in an organic affinity of its surface can be obtained by coating the surface partially or entirely with the surface modifier of the present invention. The coating method may be any one selected from a wet blending method and a dry blending method. Further, when the surface modifier of the present invention is liquid at an ordinary temperature (e.g. 25° C.) or melted by heating to become liquid, it may be mixed in this melted state with the inorganic solid.

When the surface of the inorganic solid is coated with the surface modifier of the present invention, the amount of the surface modifier depends on a specific surface area of the inorganic solid, that is, on an average particle diameter, porosity etc. However, the amount for use of the surface modifier of the present invention is preferably 0.001 to 300 parts by weight and more preferably 0.05 to 100 parts by weight per 100 parts by weight of the inorganic solid.

The surface modifier of the present invention may be used singly. Alternatively, two or more thereof may be used in combination. Further, it can be used in combination with a publicly known surface modifier, dispersant, surfactant, coupling agent or the like.

[4] Composition Containing the Inorganic Solid

The medium constituting a composition containing the inorganic solid of the present invention may be any organic compound. For obtaining the composition of the present invention, a surface of the inorganic solid may be modified to then mix with the medium, the inorganic solid may be mixed with a mixture of the medium and the surface modifier, or the surface modifier may be mixed with a mixture of the medium and the inorganic solid. The amount for use of the surface modifier of the present invention is the same as described in the item [3] above.

(4-1) Synthetic Resin Composition

The synthetic resin may be a thermoplastic resin such as polyethylene, polypropylene, polystyrene, polymethyl methacrylate, poly(vinyl chloride), poly(vinyl acetate), polybutadiene, polycarbonate, polyacrylonitrile, ABS resin, AES resin, polyamide 6, polyamide 66, polyamide 12, polyether imide, polyether ether ketone, polysulfone, polyallyl amine, polyphenylene oxide, petroleum resin, polytetrafluoroethylene, polyvinyl fluoride, polydimethyl silicone and polydiphenyl silicone, a derivative thereof, a copolymer containing (or derived from) the same, a thermosetting resin such as epoxy resin, phenol resin, polyimide, polyurethane, melamine resin, urea resin, polyester resin and unsaturated polyester resin and a derivative thereof. In this case, the inorganic solid is blended in an amount of preferably 0.01 to 500 parts by weight and more preferably 0.1 to 300 parts by weight per 100 parts by weight of the synthetic resin.

When an incombustible or flame-retardant particulate (or granule) inorganic solid is used as the inorganic solid, the resin composition can have significantly improved flame retardancy without deteriorating a mechanically physical property thereof in practice.

In particular, the inorganic solid in this case includes aluminum hydroxide, magnesium hydroxide, dolomite, hydrotalcite, calcium hydroxide, barium hydroxide, basic magnesium carbonate, zirconium hydroxide, a hydrate of tin oxide, a hydrated metal compound such as borax, an antimony oxide such as $Sb_2O_3$, $Sb_2O_4$ and $Sb_2O_5$, zinc stannate, zinc borate, zinc metaborate, barium metaborate, zinc carbonate, magnesium carbonate-calcium, calcium carbonate, barium carbonate, magnesium oxide, molybdenum oxide, zirconium oxide, tin oxide, red phosphorus, a clay mineral, carbon black and the like. An average diameter of the inorganic solid is preferably 0.001 to 100 μm and more preferably 0.01 to 20 μm.

Besides the inorganic solids described above, an organic flame-retardant based on a bromine, chlorine, nitrogen or phosphorus compound, a metal salt of a fatty acid, a silicone compound or the like may be contained.

Although an amount of the inorganic particle (or granule) blended in the flame-retardant composition described above may be determined properly depending on a kind of the inorganic solid, a kind of the resin, a shape thereof after formation (or molding), a required level of the flame retardation, the physical property of the resin and the like, the amount is preferably 30 to 300 parts by weight and more preferably 50 to 200 parts by weight per 100 parts by weight of the resin.

The amount for use of the surface modifier for obtaining the flame-retardant resin composition is preferably 0.05 to 30 parts by weight, more preferably 0.1 to 10 parts by weight and most preferably 0.2 to 5 parts by weight per 100 parts by weight of the flame-retardant inorganic solid particles.

In addition, the flame-retardant resin composition referred to herein may also contain an additive selected from various ones such as a lubricant, a nucleating agent, a plasticizer, a filler, an antistatic agent, an antioxidant, a UV absorber, a light stabilizer, a gas generating agent and a crosslinking agent.

(4-2) Rubber Composition

The rubber may be a natural rubber or a synthetic rubber such as styrene-butadiene rubber, butadiene rubber, isoprene rubber, nitrile-butadiene rubber, chloroprene rubber, urethane rubber, norbornane rubber, epichlorohydrin rubber, fluoro-rubber, silicone rubber and thermoplastic elastomer. For obtaining the rubber composition, it is preferable that the inorganic solid and the surface modifier of the present invention are mixed before the cross-linking operation is carried out.

In this case, the inorganic solid is blended in an amount of preferably 0.01 to 500 parts by weight and more preferably 0.1 to 300 parts by weight per 100 parts by weight of the rubber.

Because the surface modifier of the present invention can make even a metal hydroxide having its high basicity hydrophobic strongly, thus the rubber composition to which is added this metal hydroxide and thus which contains particles of the metal hydroxide exhibits a very superior characteristic as a tire tread.

The metal hydroxide in this case may be magnesium hydroxide, aluminum hydroxide, calcium hydroxide or the like. Magnesium hydroxide or aluminum hydroxide is preferable in particular. An average particle diameter of these metal hydroxides is preferably 5 nm to 10 μm and more preferably 10 nm to 1 μm.

An amount of the particles of the metal hydroxide blended in the rubber composition for a tire tread containing the particles of the metal hydroxide is preferably 5 to 150 parts by weight per 100 parts by weight of the rubber, and besides, 20 to 100 parts by weight of carbon black is preferably used in combination. In this case, the amount of the total inorganic particles containing the metal hydroxide and the carbon black is preferably 30 to 200 parts by weight. Within this range, the other inorganic particle such as silica, talc and alumina may be contained. The carbon black preferably includes HAF, ISAF, SAF and the like. ISAF or SAF is particularly preferable.

An amount for use of the surface modifier of the present invention is preferably 0.05 to 30 parts by weight, more preferably 0.1 to 10 parts by weight and most preferably 0.2 to 5 parts by weight per 100 parts by weight of the inorganic particles (as total amount).

The rubber for a tire tread is preferably a natural rubber, styrene-butadiene rubber, butadiene rubber or a mixture thereof. Further, it may contain the other rubber such as polyisoprene, acrylonitrile-butadiene rubber and chloroprene rubber.

The rubber composition for a tire tread containing the particles of the metal hydroxide may further contain a vulcanizing agent such as sulfur as well as at least one of various vulcanization accelerators. In addition, an additive selected from ones such as an aging inhibitor, a softener, zinc oxide, stearic acid, an antioxidant, an aromatic oil and the other resin component may be contained.

(4-3) Wax Composition

Hard or soft wax at an ordinary temperature (e.g. 25° C.) is used. For example, it includes a natural wax such as candelilla wax, carnauba wax, rice wax, Japan wax, beeswax and lanolin; a petroleum wax such as paraffin wax, micro(crystalline) wax and petrolatum; polyethylene wax; hardened castor oil etc., for example.

In this case, the inorganic solid is blended in an amount of preferably 0.01 to 500 parts by weight and more preferably 0.1 to 300 parts by weight per 100 parts by weight of the wax.

(4-4) Liquid Composition

The liquid may be a hydrocarbon solvent such as pentane, hexane, gasoline, toluene, xylene and petroleum ether; an ether-, ester- or ketone-based polar solvent such as thinner, ethyl acetate, cyclohexanone, an ether and tetrahydrofuran; an alcohol such as methanol, ethanol, propanol and butanol; as well as liquid rubber, liquid paraffin, lubricating oil, gear oil, silicone oil or the like.

In this case, the inorganic solid is blended in an amount of preferably 0.005 to 300 parts by weight and more preferably 0.05 to 100 parts by weight per 100 parts by weight of the liquid.

In the composition of the present invention; when the medium is an aliphatic (or fatty) hydrocarbon, $R^1$ or $R^2$ is particularly preferably a $C_{4-42}$ linear or branched alkyl group or a $C_{6-14}$ aryl group; when the medium is an aromatic hydrocarbon or a polar organic matter such as a hydrocarbon substituted with an ester group, ketone group, amide group or halogen, $R^1$ or $R^2$ is particularly preferably a $C_{6-42}$ aryl group or a $C_{6-42}$ hydrocarbon group having a polar substituent group; when the medium is a fluorine-containing organic matter, $R^1$ or $R^2$ is particularly preferably a $C_{1-22}$ fluoroalkyl group or a fluoroaryl group; when the medium is silicone, $R^1$ or $R^2$ is particularly preferably a $Si_{1-30}$ siloxysilyl propyl group or a $C_{6-42}$ linear or branched alkyl group; and when the medium is a protic solvent or an alcoholic organic matter, $R^1$ or $R^2$ is particularly preferably a $C_{1-3}$ alkyl group and a $C_{1-10}$ ωH-fluoroalkyl group.

EXAMPLES

The molecular weights of the synthesized surface modifiers were measured by GPC. For this measurement, 150C model supplied by Waters was used and one piece of Shodex HT-806 and two pieces of Shodex HT-803 supplied by Showa Denko K.K. were used as columns (at 130° C. using o-dichlorobenzene, molecular weight calculated as polystyrene-standard).

For measurement of the dynamic viscoelasticity and thermal deformation temperature of the synthesized resin compositions, DVA-225 supplied by ITK Corp., Ltd. was used.

An abrasion resistance was measured according to JIS K6264 (A-2 method) with an Acron-type abrasion tester (supplied by Ueshima Seisakusho Co., Ltd.). The angle between a test piece (or specimen) and a grinding wheel was 150, the loading was 2749 gf, and the number of revolution was 75 rpm (revolutions per minute).

For measurement of a volume resistivity, R8340A supplied by ADVANTEC was used. HRS type ring probe, supplied by Dia Instruments Co., Ltd., was modified and used as a probe for this measurement. A voltage for the measurement was 100 V.

For measurement of Young's modulus (modulus of elasticity in tension) and a breaking strength, TENSILON UCT-100 supplied by ORIENTEC was used.

Synthesis Example 1

Surface Modifier ① wherein p≧28000 and r=7.1.

50 g of siloxysilyl propyl glycidyl ether (with the average number of Si (silicon) atoms in the dimethyl silicone chain: 8.1) were polymerized (at 130° C. for 12 hours) by 2 mol-% (wherein "mol-%" is expressed in an amount as compared with the glycidyl ether, this holds true hereinafter) of a catalyst comprising samarium alkoxide-methylaluminoxane in toluene. By purification of re-precipitation from the reaction solution, the surface modifier ① was obtained as a colorless transparent soft polymer. This product is a modifier having a silicone chain(s) in the side chain(s). The number average molecular weight (abbreviated as Mn hereinafter) was 20,000,000 or more.

Synthesis Example 2

Surface Modifier ② wherein p=4.8.

50 g of (tridecafluoro-1,1,2,2-tetrahydrooctyl) glycidyl ether was polymerized (at 150° C. for 12 hours) by 4 mol-% of a catalyst comprising diethylzinc-glycerol in toluene. By purification of re-precipitation from the reaction solution, the surface modifier ② was obtained as a white solid(s). This product is a modifier having a fluorinated alkyl group in the side chain(s). Mn was 2000.

Synthesis Example 3

Surface Modifier ③ wherein p=890.

The surface modifier ③ was obtained as a white solid(s) in the same manner as in Synthesis Example 1 except that stearyl glycidyl ether was used in place of siloxylsilyl propyl glycidyl ether and that the amount of the catalyst was 1 mol-%. This product is a modifier having a long-chain alkyl group in the side chain(s). Mn was 290,000.

Synthesis Example 4

Surface Modifier ④ wherein p=10.

The surface modifier ④ was obtained as a white solid(s) in the same manner as in Synthesis Example 3 except that 4 mol-% of methyl alumoxane was used as the catalyst. This product is a modifier having a long-chain alkyl group in the side chain(s). Mn was 3400.

Synthesis Example 5

Surface Modifier ⑤ wherein p=680 and q=320.

The surface modifier ⑤ was obtained as a pale (, fine, dim or light) yellow solid(s) in the same manner as in Synthesis Example 3 except that 40 g of stearyl glycidyl ether and 10 g of phenyl glycidyl ether were used in place of 50 g of stearyl glycidyl ether. This product is a modifier having a long-chain alkyl group and a phenyl group in the side chain(s). Mn was 270,000.

Synthesis Example 6

Surface Modifier ⑥ wherein p=825 and q=370.

The surface modifier ⑥ was obtained as a pale yellow soft solid(s) in the same manner as in Synthesis Example 3 except that 45 g of phenyl glycidyl ether and 5 g of ethylene oxide were used in place of 50 g of stearyl glycidyl ether. This product is a modifier having a phenyl group(s) in a part of the side chains. Mn was 140,000.

Synthesis Example 7

Surface Modifier ⑦ wherein p=67 and q=18.

The surface modifier ⑦ was obtained as a pale yellow solid(s) in the same manner as in Synthesis Example 4 except that 45 g of phenyl glycidyl ether and 5 g of styrene were used in place of 50 g of stearyl glycidyl ether. Mn was 12,000.

Example 1

500 g of superfine particles of anhydrous silica (Aerogel 200 supplied by Nippon Aerogel Co., Ltd.; average particle diameter: 12 nm; BET specific surface area: 200±25 $m^2/g$)

was mixed with 5.0 g of the surface modifier ① in a Henschel mixer for 5 minutes to obtain the superfine silica particles having their surface(s) modified with the silicone polyether.

Test Example 1

Evaluation of Feeling of the Powder

The superfine particles, obtained in Example 1, of silica having the surfaces treated with the organic matter and untreated Aerogel 200 as Comparative Example 1 were evaluated for powder-feeling by 10 special panelists with the following 5 ranks. The average values are shown in Table 1.

Evaluation criteria for powder-feeling (creakiness, roughness and moist feeling)
1: Bad feeling
2: Slightly bad feeling
3: Ordinary
4: Slightly good feeling
5: Good feeling

TABLE 1

| Feeling | Example 1 | Comparative Example 1 |
|---|---|---|
| Creakiness | 4.9 | 1.5 |
| Roughness | 4.1 | 2.8 |
| Moist feeling | 4.8 | 2.1 |

Example 2

While 500 g of the same superfine particles of anhydrous silica as in Example 1 were well blended with a Henschel mixer, 12.5 mL of a 20% solution of the surface modifier ② in dichloromethane was added thereto. Under ventilation, they were well blended for 5 minutes to obtain superfine particles of silica having the surface treated with the fluoro-alkyl polyether.

Comparative Example 2

While 500 g of the same superfine particles of anhydrous silica as in Example 1 were well blended with a Henschel mixer, 12.5 mL of a 20% solution of (tridecafluoro-1,1,2,2-tetrahydrooctyl) triethoxy silane in dichloromethane was added thereto. They were well blended for 5 minutes and then heat-treated for 4 hours in an oven at 110° C. to obtain superfine silica treated by silane coupling agent.

Test Example 2

Water-Repellent/Oil-Repellent Property Test

The superfine particles, obtained in Example 2 and Comparative Example 2, of silica having the surfaces treated with the organic matter were formed into compressed pellets (φ:40 mm; thickness: 5 mm) by a compressing machine (or presser) and measured for their contact angle to water and squalene in the air, respectively. The results are shown in Table 2.

TABLE 2

| Interface | Example 2 | Comparative Example 2 |
|---|---|---|
| Water/air | 141° | 102° |
| Squalene/air | 92° | 78° |

Example 3

6.0 g of red iron oxide (Biferrox 140 M supplied by Bayer AG) and 0.12 g of the surface modifier ③ were added to 50 g of liquid paraffin, stirred under heating at 70° C., and then left until it was cooled to the room temperature. The particles of the red iron oxide were uniformly (or homogeneously) and finely dispersed without being sedimented for 12 months or more.

Comparative Example 3-1

6.0 g of the same red iron oxide as in Example 3 were added to 50 g of liquid paraffin, stirred under heating at 70° C., and then left until it was cooled to the room temperature. The particles of the red iron oxide were sedimented immediately after stirring was terminated.

Comparative Example 3-2

To 6.0 g of the same red iron oxide as in Example 3 were sprayed an ethanol solution containing 0.3 g of γ-aminopropyl triethoxy silane and air-dried. Then, they were heat-treated at 120° C. for 1 hour to obtain a red iron oxide treated by silane coupling agent. This was added to 50 g of liquid paraffin, stirred under heating at 70° C., and then left until it was cooled to the room temperature. The particles of the red iron oxide were sedimented in 2 to 3 minutes after stirring was terminated.

Test Example 3

Figure 1:
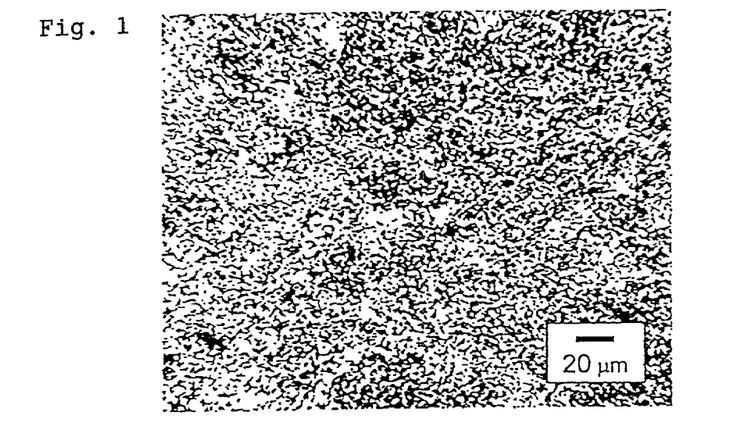
FIG. 1 is a polarizing microphotograph showing the dispersion state of the fine particles of the red iron oxide in the composition comprising red iron oxide-liquid paraffin obtained in Example 3.
Figure 2:
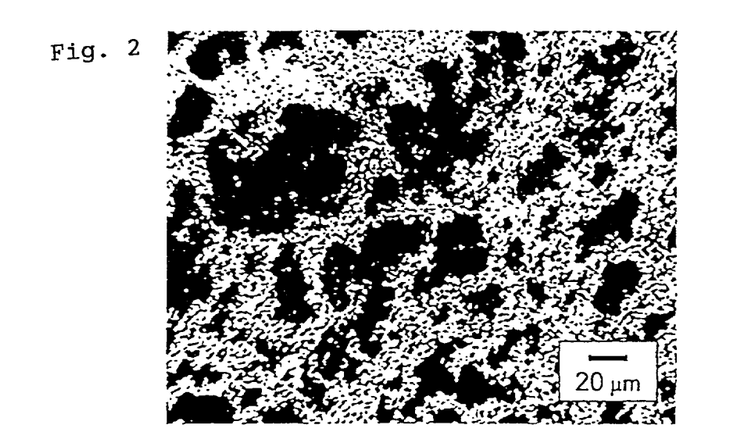
FIG. 2 is a polarizing microphotograph showing the dispersion state of fine particles of red iron oxide in the composition comprising red iron oxide-liquid paraffin obtained in Comparative Example 3-1.
Figure 3:
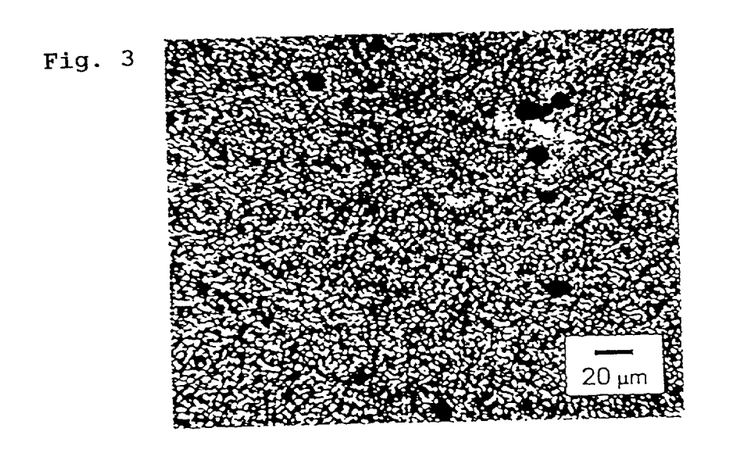
FIG. 3 is a polarizing microphotograph showing the dispersion state of fine particles of red iron oxide in the composition comprising red iron oxide-liquid paraffin obtained in Comparative Example 3-2.

The coloration of the compositions comprising red iron oxide-liquid paraffin obtained in Example 3 and Comparative Examples 3-1 and 3-2 were visually evaluated. The results are shown in Table 3. Further, the fine particles of iron red oxide in each composition were observed on the dispersion state with a polarizing microscope. Polarizing microphotographs for Example 3 and Comparative Examples 3-1 and 3-2 are shown FIGS. 1, 2 and 3 respectively, and the results of their dispersibility are collectively shown in Table 3.

TABLE 3

| | Example 3 | Comparative Example 3-1 | Comparative Example 3-2 |
|---|---|---|---|
| Evaluation of coloration | Significant improvement in chroma Light brown | Bad chroma Dark brown | Slight improvement in chroma Brown |
| Dispersibility of red iron oxide | Uniform and fine dispersion in crystallite units | Significantly aggregated Red iron oxide was light-impermeable. | Aggregation of a few particles 10 μm agglomerates also remained |

Example 4

10 g of polyethylene wax (Polywax 655 supplied by Toyo Petrolite Co., Ltd.; the melting point of 102° C.) and 40 g of n-butyl myristate were heated to be mixed and then left to be cooled, thus obtaining 50 g of crude wax. This was roll-kneaded with 6.0 g of the same red iron oxide as in Example 3 and 0.12 g of the surface modifier ④ at 50° C. for 10 minutes. Then, the roll-kneaded product was molded to obtain a red iron oxide-wax composition.

Comparative Example 4-1

50 g of the crude wax described in Example 4 was roll-kneaded with 6.0 g of red iron oxide at 60° C. for 10 minutes. Then, the roll-kneaded product was molded to obtain a red iron oxide-wax composition.

Comparative Example 4-2

50 g of the crude wax described in Example 4 was roll-kneaded with 6.3 g of the red iron oxide treated by silane coupling agent described in Comparative Example 3-2 at 50° C. for 10 minutes. Then, the roll-kneaded product was molded to obtain a red oxide-wax composition.

Test Example 4

The coloration of the red iron oxide-wax compositions obtained in Example 4 and Comparative Examples 4-1 and 4-2 were visually evaluated. The results are shown in Table 4.

TABLE 4

|  | Example 4 | Comparative Example 4-1 | Comparative Example 4-2 |
| --- | --- | --- | --- |
| Evaluation of coloration | Significant improvement in chroma Light brown | Bad chroma Dark brown Particles were distinguishable. | Slight improvement in chroma Brown |

Example 5

600 g of polystyrene (Styron 666 supplied by Asahi Chemical Industry Co., Ltd.) and 300 g of silica (Nipseel AQ supplied by Nippon Silica Co., Ltd.) were kneaded with 1.5 g of the surface modifier ⑤ by a roll kneader at 160° C. for 7 minutes to obtain a silica-containing polystyrene composition.

Comparative Example 5

A polystyrene composition was obtained in the same manner as in Example 5 except that 6 g of γ-aminopropyl triethoxy silane was used in place of 1.5 g of the surface modifier ⑤.

Test Example 5

Figure 4:
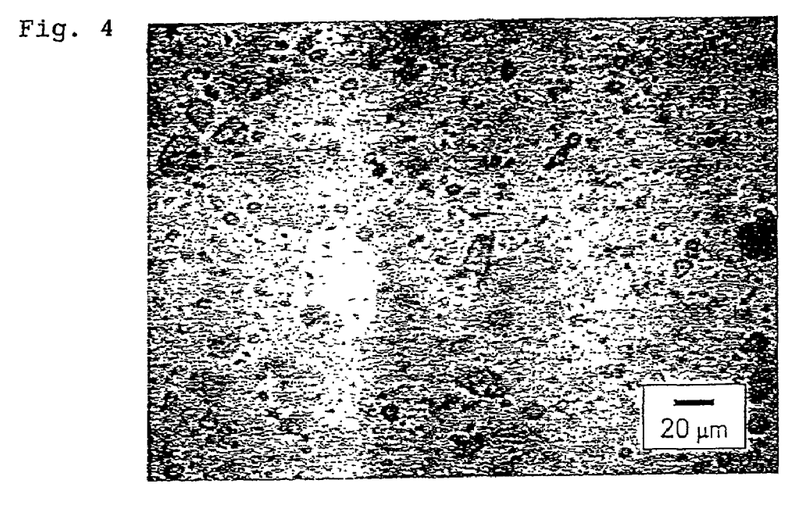
FIG. 4 is a polarizing microphotograph of a rupture section of the polystyrene composition obtained in Example 5.
Figure 5:
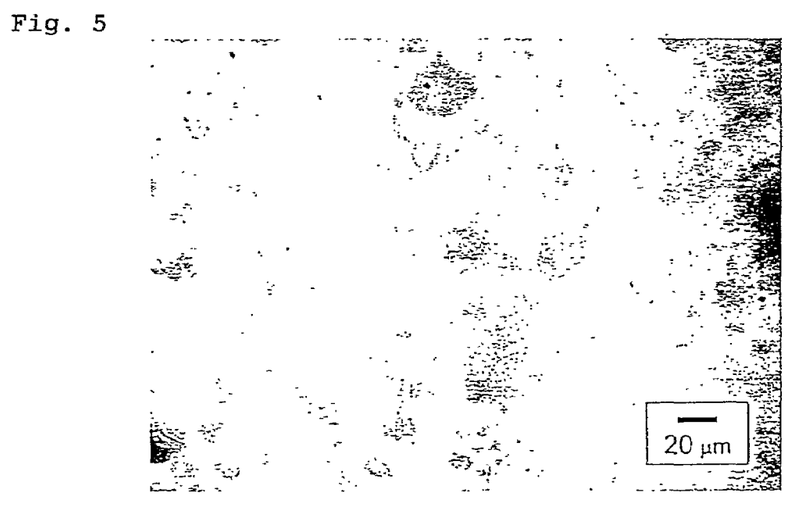
FIG. 5 is a polarizing microphotograph of a rupture section of the polystyrene composition obtained in Comparative Example 5.
Figure 6:
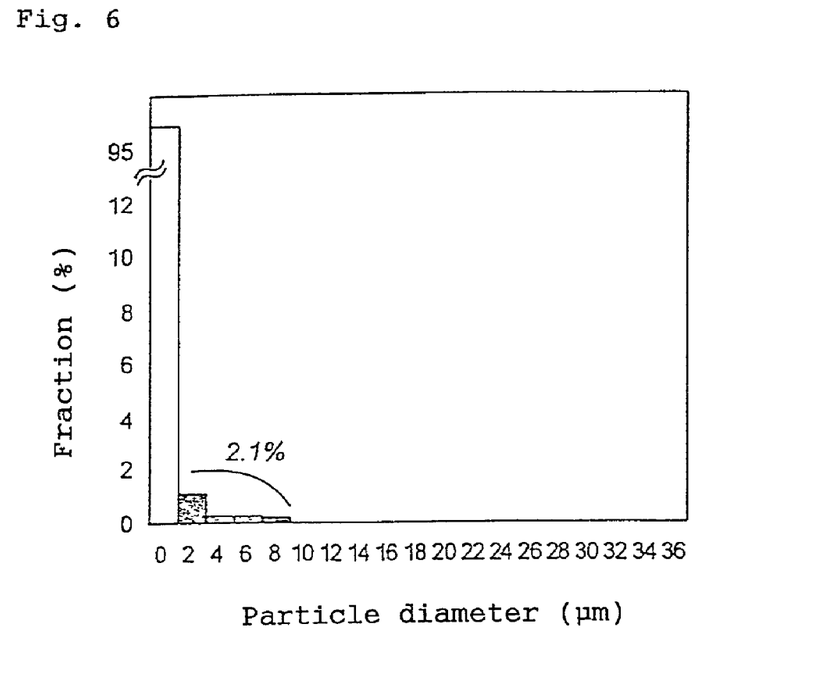
FIG. 6 shows the distribution of particle diameters of silica agglomerates in the polystyrene composition obtained in Example 5.
Figure 7:
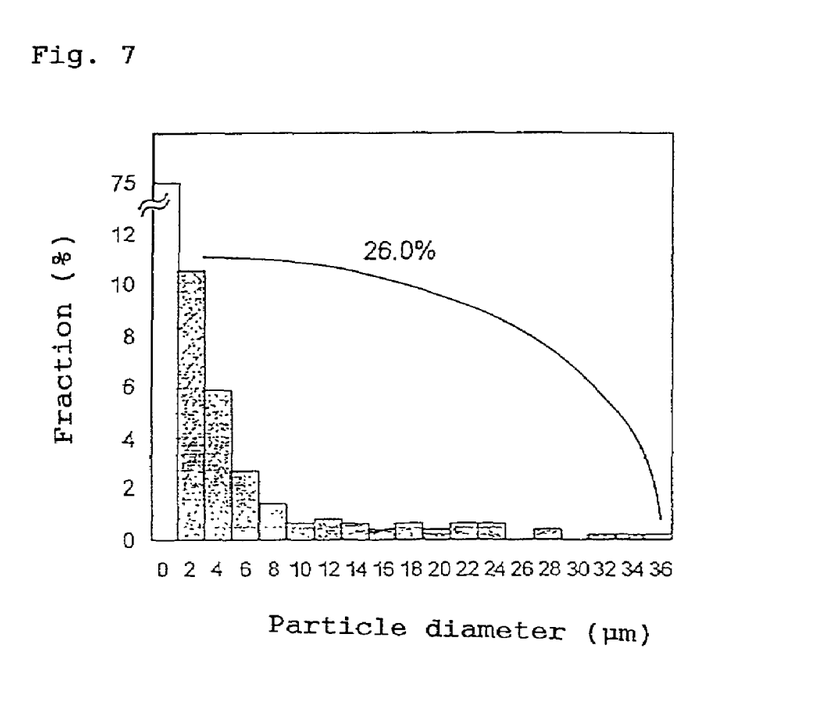
FIG. 7 shows the distribution of particle diameters of silica agglomerates in the polystyrene composition obtained in Comparative Example 5.
Figure 8:
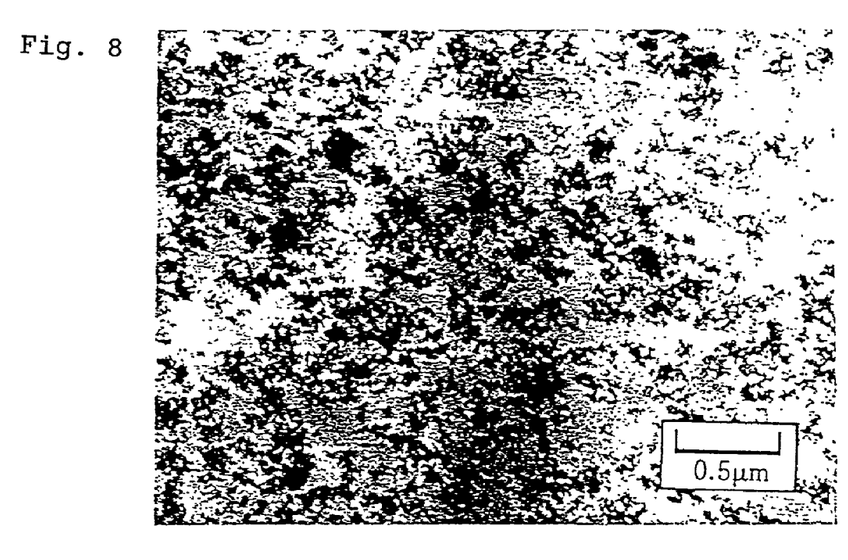
FIG. 8 is a transmission electron microphotograph of the polystyrene composition obtained in Example 5.
Figure 9:
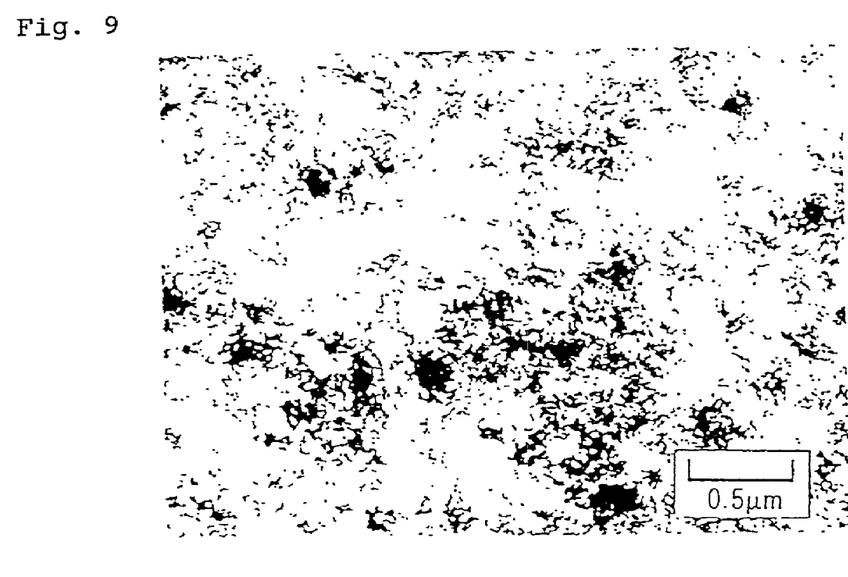
FIG. 9 is a transmission electron microphotograph of the polystyrene composition obtained in Comparative Example 5.

Rupture sections of the polystyrene compositions obtained in Example 5 and Comparative Example 5 were observed under a polarizing microscope. Each thereof are shown in FIGS. 4 and 5. Each of 10 microphotographs selected at random with the same angle of view was image-analyzed to examine the distribution of diameters of silica agglomerates. The results of the compositions in Example 5 and Comparative Example 5 are shown in FIGS. 6 and 7 respectively. The ratios, to the whole silica, of the silica agglomerates having diameters of not less than 2 μm or of not less than 10 μm and being distinguishable on the photographs are shown in Table 5. From these results, it was found that the ratio of coarse agglomerates in Example 5 is significantly lower than in Comparative Example 5. Transmission electron microphotographs of both of the polystyrene compositions are shown in FIGS. 8 and 9, respectively. In the polystyrene composition in Example 5, the silica was uniformly and finely dispersed in the form of primary particle.

TABLE 5

|  | Example 5 | Comparative Example 5 |
| --- | --- | --- |
| Ratio of not less than 2 μm silica (%) | 2.1 | 26.0 |
| Ratio of not less than 10 μm silica (%) | 0 | 5.8 |

Example 6

360 g of natural rubber (RSS No. 1), 240 g of styrene-butadiene rubber (Nippol#1502 supplied by Nippon Zeon Co., Ltd.), 300 g of carbon black (Seast 300 supplied by Tokai Carbon Co., Ltd.) and 0.75 g of the surface modifier ⑤ were principally kneaded for 4 minutes in a small Banbury mixer at 140° C. Then, this product was transferred to a roll kneader at 70° C. 18 g of sulfur and 3 g of each of two vulcanization accelerators (dibenzothiazyl disulfide and N-oxydiethylene-2-benzothiazolylsulfenamide or 2-(morpholinothio)benzothiazole) were added thereto and further kneaded for 7 minutes. A part of the obtained rubber composition was pressed to be molded into a plate of 2 mm in thickness (170° C., 15 minutes).

Comparative Example 6

A rubber composition was obtained in the same manner as in Example 6 except that 15 g of sodium dialkylsulfosuccinate (Pelex OT-P supplied by Kao Corp.) were used in place of 0.75 g of the surface modifier ⑤.

Test Example 6

The rubber compositions obtained in Example 6 and Comparative Example 6 were measured in dynamic viscoelasticity thereof. The elasticity and tan δ value at 50° C. are shown in Table 6. The high elasticity of the rubber composition in Example 6 indicates that the carbon black is more finely dispersed in the rubber composition by the surface modifier of the present invention. On the other hand, the small tan δ value of the rubber composition in Example 6 indicates that, as compared with the conventional dispersant, the surface modifier of the present invention adheres more firmly to the surface of carbon black, thus significantly reducing the loss in energy on the interface.

The contents of 2 μm or more coarse agglomerates of the carbon black in the rubber compositions in Example 6 and Comparative Example 6 were measured under a polarizing microscope. The results are also shown in Table 6.

TABLE 6

|  | Example 6 | Comparative Example 6 |
| --- | --- | --- |
| Ratio of 2 μm or more carbon black (%) | 0.2 | 13.0 |
| Elasticity (50° C.) (Pa) | $1.27 \times 10^7$ | $4.48 \times 10^6$ |
| tan δ (50° C.) | 0.098 | 0.115 |

Example 7

A rubber composition was obtained in the same manner as in Example 6 except that 150 g of carbon black and 120 g of aluminum hydroxide (Highgilite H-43M supplied by Showa Denko, K.K.) were used in place of 300 g of carbon black.

Comparative Example 7

A rubber composition was obtained in the same manner as in Example 7 except that 12 g of bis(3-triethoxysilyl propyl) polysulfide [number of sulfur atoms in the polysulfide moiety: 2 to 8] were used in place of 0.75 g of the surface modifier ⑤.

Test Example 7

The grip performances (from tan α value at 0° C.), the rolling resistances (from tan α value at 50° C.) and the abrasion resistances of the rubber compositions obtained in Example 7 and Comparative Example 7 were evaluated and shown in Table 7. All thereof are shown as index numbers when the value of the rubber composition in Comparative Example 7 is made to 100. The bigger the index is, the better the performance is.

The rubber composition in Example 7, as compared with the composition in Comparative Example 7, shows extremely high grip performance and rolling resistance while maintaining very high abrasion resistance. This indicates that the surface modifier of the present invention, as compared with the silane coupling agent, adheres more firmly to the surface of aluminum hydroxide, thus significantly reducing the loss in energy on the interface to make the loss small and simultaneously increasing the affinity for the rubber matrix.

TABLE 7

|  | Example 7 | Comparative Example 7 |
|---|---|---|
| Grip performance | 115 | 100 |
| Rolling resistance | 118 | 100 |
| Abrasion resistance | 108 | 100 |

Example 8

A rubber composition was obtained in the same manner as in Example 6 except that 150 g of carbon black and 120 g of magnesium hydroxide (Kisuma 5A supplied by Kyowa Chemical Industry Co.) were used in place of 300 g of carbon black.

Comparative Example 8

A rubber composition was obtained in the same manner as in Example 8 except that 12 g of bis(3-triethoxysilyl propyl) polysulfide [number of sulfur atoms in the polysulfide moiety: 2 to 8] were used in place of 0.75 g surface modifier ⑤.

Test Example 8

The grip performances, the rolling resistances and the abrasion resistances of the rubber compositions obtained in Example 8 and Comparative Example 8 were evaluated in the same manner as in Test Example 7. Then, the results are shown as index numbers in Table 8 when the value of the rubber composition in Comparative Example 8 is made to 100.

The rubber composition in Example 8, as compared with the composition in Comparative Example 8, shows extremely high grip performance while maintaining high rolling resistance and abrasion resistance. This indicates that the surface modifier of the present invention, as compared with the silane coupling agent, adheres more firmly to the surface of magnesium hydroxide, thus significantly reducing the loss in energy on the interface to make the loss small and simultaneously increasing the affinity for the rubber matrix.

TABLE 8

|  | Example 8 | Comparative Example 8 |
|---|---|---|
| Grip performance | 112 | 100 |
| Rolling resistance | 108 | 100 |
| Abrasion resistance | 106 | 100 |

Example 9

1 to 5 g of tubular graphite were added to 100 g of the same polystyrene as in Example 5 and roll-kneaded at 160° C. for 7 minutes. At that time, the surface modifier ⑤ in an amount of 0.5% per an each amount of the tubular graphite was added thereto. The obtained tubular graphite-containing polystyrene compositions were pressed to be molded into a plate of 10 mm in thickness (165° C., 2 minutes).

The tubular graphite was synthesized in the following manner.

1 kg of a copolymer of butyl methacrylate and vinylferrocene at the ratio of 9:1 and 1 kg of petroleum pitch were mixed well and pyrolyzed in a nitrogen stream in a siliconit tube furnace at 1000° C. After the pyrolysate was left to be cooled, a carbon compound precipitated on the inner wall at the edge of the furnace was collected and sufficiently washed with hexane and then with toluene. This product was pulverized in a wet system (for 48 hours) in a bowl mill in ethanol and then dried. It was confirmed by a transmission electron microscope that this carbonous compound was tubular graphite of 10 to 20 nm in diameter.

Comparative Example 9-1

Pressed articles of the tubular graphite-containing polystyrene compositions were obtained in the same manner as in Example 9 except that the sodium dialkylsulfosuccinate (same as in Comparative Example 6) in an amount of 3% per the used mount of the tubular graphite was used in place of the surface modifier ⑤.

Comparative Example 9-2

As the blank, only polystyrene was pressed to be molded under the same conditions as in Example 9.

Test Example 9

The 10 polystyrene compositions described in Example 9 and Comparative Example 9-1 in total and the polystyrene described in Comparative Example 9-2 were measured for their volume resistivity. The results are shown in Table 9. The volume resistivities of the polystyrene compositions described in Comparative Example 9-1 were not reduced to $10^7$ Ω·cm or less unless at least 4 g of the tubular graphite were added thereto. On the other hand, the volume resistivitys of the polystyrene compositions described in Example 9 which comprises the surface modifier of the present invention showed the order of $10^5$ Ω·cm by adding only 1 g of the tubular graphite. This is because the highly electrically conductive tubular graphite was dispersed efficiently without aggregation.

TABLE 9

|  | Tubular graphite (parts by weight) | Volume resistivity (Ω · cm) |
|---|---|---|
| Example 9 | 1 | $2.1 \times 10^5$ |
|  | 2 | $7.2 \times 10^2$ |
|  | 3 | $10^{-2}$ or less |
|  | 4 | $10^{-2}$ or less |
|  | 5 | $10^{-2}$ or less |
| Comparative Example 9-1 | 1 | $10^{13}$ or more |
|  | 2 | $10^{13}$ or more |
|  | 3 | $7.8 \times 10^{12}$ |
|  | 4 | $4.6 \times 10^6$ |
|  | 5 | $3.1 \times 10^3$ |
| Comparative Example 9-2 | 0 | $10^{13}$ or more |

Example 10

2000 g of nylon (1013B supplied by Ube Industries, Ltd.) 1 g of the surface modifier (6), 100 g of natural refined montmorillonite (Kunipia F supplied by Kunimine Industries Co. Ltd.) were kneaded at 260° C. for 2 minutes by using a twin screw extruder to obtain a clay-containing nylon composition. The clay minerals were finely dispersed in the nylon resin, and coarse particles could not be confirmed with eyes.

Comparative Example 10

A clay-containing nylon composition was obtained in the same manner as in Example 10 except that the surface modifier (6) was not used. The clay particles were not finely dispersed in the nylon resin, and innumerable aggregates of tens to hundreds μm were recognized even with eyes.

Test Example 10

The tensile moduli, breaking strength, temperature by heat for deformation and transparencies (transmittances of light at 500 nm) of the clay-containing nylon compositions obtained in Example 10 and Comparative Example 10 were determined. The results are shown in Table 10.

TABLE 10

|  | Example 10 | Comparative Example 10 |
|---|---|---|
| Young's modulus (Pa) | $2.18 \times 10^9$ | $1.67 \times 10^9$ |
| Breaking strength (Pa) | $1.10 \times 10^8$ | $8.43 \times 10^7$ |
| Temperature by heat for deformation (° C.) | 118.5 | 68.5 |
| Transparency (transmittance of light at 500 nm, %) | 87 | 48 |

Example 11

0.125 g of the surface modifier (7) was mixed with 2.5 g of copper phthalocyanine (Irgazine Blue X-3367 supplied by Ciba Speciality Chemicals Co., Ltd.) at 80° C. Then, 50 g of polyester resin (Bayron supplied by Toyobo Co., Ltd.) was added thereto, and the resultant mixture was kneaded for 5 minutes in a small twin screw extruder to obtain a pigment-dispersed polyester composition. This composition shows vividly blue with transparency, and not less than 2 μm coarse agglomerates of the pigment were not observed under an optical microscope.

Comparative Example 11

A pigment-dispersed polyester composition was obtained in the same manner as in Example 11 except that the surface modifier (7) was not used and that 2.5 g of copper phthalocyanine and 50 g of polyester resin only were used. This composition showed opaque and blue, and when it was observed under an optical microscope, the resin matrix was basically uncolored and the pigment formed coarse agglomerates of a few to tens μm or more.

Example 12

0.01 g of the surface modifier (1) and 0.5 g of superfine particles of titanium oxide (TTO-55 supplied by Ishihara Sangyo Kaisha, Ltd.) were added to 10 g of silicone oil (KF-96A supplied by Sin-Etsu Co., Ltd.; 6 cs). The resultant mixture was stirred under heating at 50° C. and then treated for 15 minutes in an ultrasonic shaker to obtain a composition of superfine particles of titanium oxide dispersed in silicone oil. When this composition was calmly left, the particles of the titanium oxide were dispersed uniformly without being sedimented for 12 hours or more. When this composition was observed under a polarizing microscope, not less than 2 μm coarse agglomerates of titanate oxide were not recognized.

Comparative Example 12

A composition of superfine particles of titanium oxide dispersed in silicone oil was obtained in the same treatment as in Example 12 except that the surface modifier (1) was not used and that 0.5 g of superfine particles of titanium oxide having a surface treated previously with 0.05 g of (tridecafluoro-1,1,2,2-tetrahydrooctyl)triethoxy silane was added to 10 g of silicone oil. When this composition was calmly left, all particles of the titanium oxide were sedimented within 5 minutes. When this composition was observed under a polarizing microscope, the titanium oxide formed coarse agglomerates of tens μm or more.

Example 13

100 g of melamine resin (Superbekkamin G-821-60 supplied by Dainippon Ink and Chemicals, Inc.), 80 g of copper powder (average particle diameter: 6 μm), 5 g of linoleic acid and 0.4 g of the surface modifier (5) were roll-kneaded for 15 minutes. The roll-kneaded product was applied in a thickness of 1 μm onto a glass substrate thereon and then hardened by keeping it at 150° C. for 15 minutes to obtain a coated film of a copper powder-containing melamine resin composition.

Comparative Example 13

A coated film of a copper powder-containing melamine resin composition was obtained in the same manner as in Example 13 except that the surface modifier (5) was not added.

Test Example 11

The copper powder-containing melamine resin compositions obtained in Example 13 and Comparative Example 13 were measured for their volume resistivity. The results are shown in Table 11. In Example 13, the copper powders were dispersed without aggregation to show higher conductance.

TABLE 11

|  | Example 13 | Comparative Example 13 |
|---|---|---|
| Volume resistivity (Ω · cm) | 7.2 × 10⁻⁵ | 3.1 × 10⁻² |

Example 14

3.0 g of the surface modifier ③ were dissolved in 300 g of chloroform. 150 g of magnesium hydroxide (Kisma 5 supplied by Kyowa Chemical Industry Co.) was added thereto and sufficiently stirred with a tissue grinder. The stirred product was sufficiently dried in order to obtain a surface-treated magnesium hydroxide. 150 g of this surface-treated magnesium hydroxide, 100 g of a low-density polyethylene (Sumikasen F208-1 supplied by Sumitomo Chemical Co., Ltd.), and 0.1 g of stearic acid as lubricant (Lunac S-40 supplied by Kao Corp.) were melted and kneaded for 30 minutes in a roll kneader at 120° C. to obtain a magnesium hydroxide-containing polyethylene composition.

Comparative Example 14-1

A surface-treated magnesium hydroxide was obtained in the same manner as in Example 14 except that 3.0 g of stearic acid (Lunac S-40 supplied by Kao Corp.) were used in place of the surface modifier ③. 150 g of this surface-treated magnesium hydroxide and 100 g of a low-density polyethylene (Sumikasen F208-1 supplied by Sumitomo Chemical Co., Ltd.) were melted and kneaded for 30 minutes in a roll kneader at 120° C. to obtain a magnesium hydroxide-containing polyethylene composition.

Comparative Example 14-2

A magnesium hydroxide-containing polyethylene composition was obtained in the same manner as in Comparative Example 14-1 except that 150 g of Kisma 5B (Kyowa Chemical Industry Co.) were used as the surface-treated magnesium hydroxide.

Example 15

An aluminum hydroxide-containing polyethylene composition was obtained in the same manner as in Example 14 except that 150 g of aluminum hydroxide (Highgilite H-42M supplied by Showa Denko, K.K.) were used in place of magnesium hydroxide.

Comparative Example 15

An aluminum hydroxide-containing polyethylene composition was obtained in the same manner as in Comparative Example 14-1 except that 150 g of aluminum hydroxide (Highgilite H-42M supplied by Showa Denko, K.K.) was used in place of magnesium hydroxide.

Test Example 12

The evaluation of flame retardation complied with the oxygen index method described in JIS K7201. The tensile breaking strength complied with JIK K7113. Izod impact value complied with JIS K7110.

TABLE 12

|  |  | Example | | Comparative Example | | |
|---|---|---|---|---|---|---|
|  |  | 14 | 15 | 14-1 | 14-2 | 15 |
| Composition | LDPE | 100 | 100 | 100 | 100 | 100 |
|  | Mg(OH)₂ | 150 |  | 150 | 150 |  |
|  | Al(OH)₃ |  | 150 |  |  | 150 |
|  | Surface modifier ③ | 3.0 | 3.0 |  |  |  |
|  | Stearic acid | 0.1 | 0.1 | 3.0 | 3.0 | 3.0 |
| Evaluation | Oxygen index | 38 | 39 | 33 | 32 | 34 |
|  | Tensile breaking strength (MPa) | 13.1 | 11.2 | 10.8 | 11.3 | 9.3 |
|  | Izod impact strength (kgf · cm/cm) | 7.2 | 6.3 | 6.1 | 6.2 | 5.8 |

In each of the resin compositions in Examples 14 and 15, as compared with the compositions in Comparative Examples 14-1, 14-2 and 15, the oxygen index rises in spite of the same content of the flame-retardant, thus showing an improvement in flame retardation. This indicates that the surface modifier of the present invention is superior to the fatty acid in the dispersibility of the inorganic flame-retardant in the resin to increase its surface area.

The invention claimed is:

1. A surface modifier for an inorganic solid, which comprises a polyether having a monomeric unit represented by formula:

(I)

wherein $R^1$ represents a hydrogen atom; an optionally substituted $C_{1-50}$ hydrocarbon, $C_{1-50}$ fluoroalkyl, $C_{6-50}$ fluoroaryl or $Si_{1-50}$ siloxysilylpropyl group; or a group represented by —$(AO)_m$—$R^2$;

in which $R^2$ represents an optionally substituted $C_{1-42}$ hydrocarbon, $C_{1-42}$ fluoroalkyl, $C_{6-42}$ fluoroaryl or $Si_{1-40}$ siloxysilylpropyl group; A represents a $C_{2-3}$ alkylene group; m is a number selected from 1 to 100; and m×A's may be the same or different; and p is 67-100,000.

2. An inorganic solid having at least a part of its surface coated with the surface modifier defined in claim 1.

3. A composition of a synthetic resin, which comprises the surface modifier as defined in claim 1 and an inorganic solid.

4. A composition of a rubber, which comprises the surface modifier as defined in claim 1 and an inorganic solid.

5. A composition of a wax, which comprises the surface modifier as defined in claim 1 and an inorganic solid.

6. A composition of a liquid, which comprises the surface modifier as defined in claim 1 and an inorganic solid.

7. A composition of a flame-retardant resin, which comprises the surface modifier as defined in claim 1 and an inorganic solid.

8. A method which comprises treating a surface of an inorganic solid with the polyether as defined in claim 1 and dispersing it in a medium.

9. A method which comprises treating a surface of an inorganic solid with the polyether as defined in claim 1 to modify the surface.

10. The method as claimed in claim 8, wherein the medium is a synthetic resin, a rubber, a wax, a flame-retardant resin composition or a liquid.

11. A method of dispersing an inorganic solid in a medium, which comprises:

modifying the surface of an inorganic solid with the polyether as defined in claim 1, and dispersing the modified inorganic solid in a medium.

12. The method claimed in claim 11 in which the medium is a synthetic resin, a rubber, a wax, a flame-retardant resin composition or a liquid.

13. A method of modifying a surface of an inorganic solid, which comprises:

treating the surface of an inorganic solid with the polyether as defined in claim 1 to modify the surface.

* * * * *